United States Patent [19]

Bertin et al.

[11] 3,785,800

[45] Jan. 15, 1974

[54] NEW SUBSTITUTED PYRIMIDINE

[75] Inventors: Daniel Bertin, Montrouge; Jacques Perronnet; Andre Teche, both of Paris, all of France

[73] Assignee: Roussel UCLAF, Paris, France

[22] Filed: Oct. 8, 1971

[21] Appl. No.: 187,914

Related U.S. Application Data

[62] Division of Ser. No. 3,499, Jan. 16, 1970, Pat. No. 3,658,819.

[30] Foreign Application Priority Data

Jan. 21, 1969 France .............................. 69010011

[52] U.S. Cl. ................................................. 71/92
[51] Int. Cl. .............................................. A01n 9/22
[58] Field of Search ............................................ 71/92

[56] References Cited
UNITED STATES PATENTS 3,235,360    2/1966    Soboczenski .......................... 71/92

Primary Examiner—Lewis Gotts
Assistant Examiner—Catherine L. Mills
Attorney—Hammond & Littell

[57] ABSTRACT

A new substituted pyrimidine, of formula I :

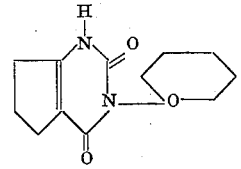

(I)

compositions containing the same, process and method.

The compound I possesses pesticidal, particularly herbicidal properties.

2 Claims, No Drawings

NEW SUBSTITUTED PYRIMIDINE

PRIOR APPLICATION

This application is a division of our copending application Ser. No. 3,499 filed Jan. 16, 1970, now U.S. Pat. No. 3,658,819.

THE PRIOR ART

French Pat. No. 1,270,771 describes herbicidal compounds of the formula:

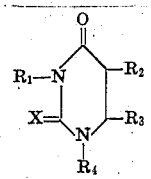

where X is oxygen or sulfur, and the substituents $R_1$ to $R_4$ are covalent radicals.

OBJECTS OF THE INVENTION

It is an object of the invention to provide the novel substituted pyrimidine of formula I.

It is another object of the invention to provide a process for the preparation of compound I.

It is a further object of the invention to provide novel herbicidal compositions.

It is an additional object of the invention to provide a novel method of controlling weeds.

These and other objects and advantages of the invention will become obvious from the following detailed description.

THE INVENTION

The invention relates to 3-(2'-tetrahydropyranyl)-1,2,3,4,6,7-hexahydro-5H-cyclopentapyrimidine 2,4-dione, of formula I:

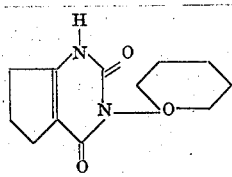

(I)

The compound of formula I is endowed with remarkable pesticidal, specifically herbicidal properties which make it useful in agriculture for controlling harmful organisms and more particularly for controlling the growth of weeds.

The process of the invention for the preparation of compound I comprises condensing 2-ethoxycarbonyl-cyclopentanone with N-(2-tetrahydropyranyl)-urea in the presence of a proton donor, cyclizing the resulting N-(2'-tetrahydropyranyl)-N'-(2-ethoxycarbonyl)-1-cyclopentenyl-urea in the presence of a basic agent, and recovering the desired compound of formula I.

Preferably, the proton donor is an acid, such as phosphoric acid, acetic acid, pyruvic acid, and ammonium salt such as ammonium chloride, or an acidic ion exchange resin.

The condensation of 2-ethoxycarbonyl-cyclopentanone with N-(2-tetrahydropyranyl)-urea is preferably carried out in an organic polar solvent such as acetonitrile, nitrobenzene, nitromethane or dimethylsulfoxide.

The basic agent used in the cyclization reaction is preferably an alkali-metal alcoholate such as an alkali-metal alkoxide, e.g., sodium or potassium, methylate or ethylate, and the cyclization reaction is performed in the presence of an alcohol such as ethanol; or the basic agent is an alkali-metal amide such as sodium or potassium amide, or an alkali-metal hydride, such as sodium hydride, and the cyclization reaction is performed in an ether such as tetrahydrofuran, ethyl ether, or in dimethylformamide.

The preparation of 2-ethoxycarbonyl-cyclopentanone and of N-(2-tetrahydropyranyl)-urea are described by way of examplification in the experimental part of the description.

The pesticidal, specifically herbicidal compositions of the invention, generally, contain from 10 to 80 percent by weight of the compound I as active ingredient, and an adjuvant. These compositions may also contain one or several other pesticidal agents or one or several products influencing plant growth.

Preferably, the compositions of the invention contain from 10 to 50 percent by weight of active ingredient.

The compositions of the invention can be in the form of powders, granules, suspensions, emulsions, solutions containing specifically, in addition to the active principles, an adjuvant, such as a surface-active cationic, anionic or non-ionic agent, such as aryl or alkylarlsulfonates, inert powders such as talc, clays, silicates, colloidal kaolin, kieselguhr, synthetic silica, and the like, and/or a vehicle such as water, alcohol, hydrocarbons or other organic solvents, a mineral, animal or vegetable oil, etc.

The invention likewise relates to a method of pesticidal control.

Said method is more particularly a method of controlling the growth of harmful organisms and specifically of weeds, which comprises contacting the harmful organisms, particularly the weeds and/or their seeds, with a pesticidal amount, particularly a herbicidal amount of the compound I. The compound of formula I is preferably applied in the form of the compositions described above.

The compositions of the invention are applied at doses sufficient to exert their pesticidal, specifically herbicidal activities. The doses of active ingredient to be applied may vary as a function of the weeds, the nature of the ground and the weather conditions.

The invention also relates to N-(2'-tetrahydropyranyl)-N'-(2-ethoxycarbonyl)-1-cyclopentenyl-urea which is an intermediate in the process described above.

The following examples illustrate the invention without however limiting it.

Preparations

Preparation I : 2-ethoxycarbonyl-cyclopentanone

Into 500 c.c. of dimethylsulfoxide, one introduces, under an atmosphere of nitrogen, 25 g of a 50 percent sodium hydride suspension in vaseline oil, then a solution of 101 g of ethyl adipate,in 101 c.c. of dimethylsulfoxide, is added over a period of about 1 hour. One agitates the reaction mixture at 25°C for 2 hours, heats it to 100°C and keeps it at that temperature for 1 hour.

One cools the reaction mixture, pours it into a mixture of water and ice, acidifies to pH = 2 with a 22° B. aqueous solution of hydrochloric acid, extracts the aqueous phase with ethyl acetate, washes the organic extracts with water, dries them, concentrates them to dryness under reduced pressure, redistills the residue in vacuo and obtains 47.5 g of 2-ethoxycarbonyl-cyclopentanone, B.p.$_{42\ mm\ Hg}$ = 132°C.

Analysis : $O_8H_{12}O_3$ ; molecular weight = 156.18
Calculated : C percent 61.52  H percent 7.75
Found : 61.6  7.7

This compound is identical to that described by P.S. PINKNEY Organic Synth, XVII, p. 31 (1937 edition).
Preparation II : N-(2-tetrahydropyranyl)-urea One takes to reflux a mixture of 120 g of urea, 500 c.c. of benzene, 170 g of 2,3-dihydropyran and 5 g of p-toluenesulfonic acid, keeps at reflux temperature for 1 hour, cools the reaction mixture to 20°C, isolates the precipitate thus formed by suction-filtering, crystallizes it from ethanol and obtains 80 g of N-(2-tetrahydropyranyl)-urea ; m.p. = 188°C.

A sample of this product is purified by crystallization from ethanol ; m.p. = 191°C.

Analysis : $C_6H_{12}N_2O_2$ ; molecular weight = 144.18
Calculated : C percent 49.97  H percent 8.39  N percent 19.44
Found : 50.0  8.4  19.3

This compund is identical to that described by S.M. AMIR et al. Nature 192, 1069 (1961).

Example 1 : 3-(2'-tetrahydropyranyl)-1,2,3,4,6,7-hexahydro 5H-cyclopentapyrimidine 2,4-dione
Stage A : N-(2'-tetrahydropyranyl)-N'-(2-ethoxycarbonyl)-1-cyclopentenyl-urea One heats to 70°C a mixture of 37 g of 2-ethoxy-carbonyl-cyclopentanone, 300 c.c. of acetonitrile, 100 c.c. of benzene and 5 c.c. of phosphoric acid, introduces thereto, over a period of about 1 hour, 50 g of N-(2-tetrahydropyranyl)-urea, takes the reaction mixture to reflux, keeps it an reflux for 2 hours, while removing the water formed during the reaction by azeotropic distillation and simultaneously adding benzene to keep the volume constant. One then adds 25 g of N-(2-tetrahydropyranyl)-urea, continues distillation with addition of benzene for 2 hours, again adds 25 g of N-(2-tetrahydropyranyl)-urea and keeps at reflux with distillation and addition of benzene for 2 more hours. One cools the reaction mixture and concentrates it to dryness under reduced pressure. The residue is purified by chromatography on silica gel while eluting with a mixture of benzene and ethyl acetate (7-3) and one obtains 6 g of N-(2'-tetrahydropyranyl)-N'-(2-ethoxycarbonyl)-1-cyclopentenyl-urea ; m.p. = 116°C.
I.R. Spectrum (in chloroform)
Absorptions at
  3436 $^{cm-1}$ (associated –NH) ;
  1709, 1661, 1625 $^{cm-1}$ (carbonyl groups and double bond C=C) ;
  1520 $^{cm-1}$ (–HN–).

As far as is known, this compound is not described in the literature.
Stage B : 3-(2'-tetrahydropyranyl)-1,2,3,4,6,7 5H-cyclopentapyrimidine 2,4-dione One takes to reflux a mixture of 220 c.c. of ethanol, 21 g of sodium methylate and 18.5 g of N-(2'-tetrahydro-pyranyl)-N'-(2-ethoxycarbonyl)-1-cyclopentenyl-urea, keeps at reflux temperature for 10 minutes, cools the reaction mixture, concentrates it to dryness under reduced pressure, dissolves the residue in water, acidifies the aqueous solution with a 22° B. aqueous solution of hydrochloric acid, isolates the precipitate thus formed by suction-filtering, dries it and obtains 11.5 g of 3-(2'-tetrahydropyranyl)-1,2,3,4,6,7-hexahydro 5H-cyclopentapyrimidine 2,4-dione ; m.p. = 269°C, which remained unchanged after recrystallization from ethanol.

Analysis : $C_{12}H_{16}N_2O_3$ ; molecular weight = 236.25
Calculated : C percent 61.00  H percent 6.82  N percent 11.86
Found : 61.0  6.7  12.0

As far as is known, this compound is not described in the literature.
Example 2 : Wettable powder composition
The following ingredients were mixed and crushed until a fine powder was obtained:

| | Parts by weight |
|---|---|
| Compound of formula I | 25 |
| Ekapersol S | 15 |
| Brecolane N.V.A. | 0.5 |
| Synthetic silica | 34.5 |
| Colloidal kaolin | 25 |

The composition thus obtained may be applied with the usual spraying devices after dilution.

Ekapersol S is the trade name of a sodium dinaphtylmethanedisulfonate.

Brecolane N.V.A. is the trade name of a sodium alkylnaphtalenesulfonate.

As indicated above, compound I possesses herbicidal properties.

The herbicidal activity of the compound I, was evidenced by tests on plants representative of the great botanical families such as oats, wheat, maize, foxtail grass (Gramineae), beet (Chenopodiaceae), chrysanthemum (Compositae), bean, clover (Papilionaceae), flax (Linaceae) and mustard (Cruciferae).

Details of the herbicidal tests are given below. Study of the pre-emergence herbicidal properties of the compund of formula I :

The 9 plants used (oats, beet, wheat, chrysanthemum, flax, maize, mustard, clover and foxtail grass) were cultivated in a culture vessel (23 × 14 × 4 cm), with a double-bottom for watering from below. The 9 plants were sown, at the rate of 20 seeds each, in a single vessel, and four of such vessels were used for each dose of compound I. The conditions of cultivation were the following :
temperature : 20°C ± 2°C ; relative humidity : about 60 percent; lighting by fluorescent tubes (daylight + brilliant white type) : from 6 a.m. to 10 p.m. every day. The earthy mixture used was composed of 10 volumes of earth, 10 volumes of river sand and 2 volumes of peat.

The produce to be studied was applied twenty-four hours after sowing, under standard conditions, by means of a microsprayer, at doses corresponding to 10, 5, 2.5 and 1.25 kg/ha and at a dilution corresponding to 560 l/ha.

The efficacy of the tested compound was checked by weighing the seedlings 21 days after treatment, in comparison with non-treated controls.

The following table expresses the results obtained in pre-emergence treatment for compound I.

The results are expressed in percentage of reduction of the vegetation P :

$$P = \frac{\text{weight of the control seedlings} - \text{weight of the treated seedlings}}{\text{weight of the control seedlings}} \times 100$$

| | Percent | | | |
|---|---|---|---|---|
| | 10 kg./ha. | 5 kg./ha. | 2.5 kg./ha. | 1.25 kg./ha. |
| Oats | 65 | 70 | 73 | 72 |
| Wheat | 36 | 30 | 31 | 38 |
| Maize | 36 | 20 | 21 | 10 |
| Foxtail grass | 91 | 91 | 93 | 85 |
| Beet | | | | 100 |
| Chrysanthemum | | | | 100 |
| Flax | 100 | 94 | 63 | 46 |
| Mustard | | | 100 | 97 |
| Clover | | | | 100 |

Conclusion

Compound I is endowed with a good pre-emergence herbicidal activity on most of the dicotyledons and on foxtail grass, while it has only a slight activity on wheat and on maize.

The post-emergence herbicidal activity of compound I was evidenced on the same plants, by tests analogous to that described for pre-emergence activity, but the treatment is effected 21 days after sowing.

Various modifications of the process, compositions and method of the invention may be made without departing from the spirit and scope thereof.

We claim:

1. A herbicidal composition containing from 10 to 80 percent by weight of 3-(2'-tetrahydropyranyl)-1,2,3,4,6,7-hexahydro 5H-cyclopentapyrimidine 2,4-dione as active ingredient and an adjuvant.

2. A method of controlling the growth of weeds which comprises contacting said weeds with a herbicidal amount of 3-(2'-tetrahydropyranyl)-1,2,3,4,6,7-hexahydro 5H-cyclopentapyrimidine 2,4-dione.

* * * * *